United States Patent [19]

Johnson

[11] 4,402,260
[45] Sep. 6, 1983

[54] HYDRAULIC PACKER SAFETY LATCH

[75] Inventor: Don R. Johnson, Wolfforth, Tex.

[73] Assignee: Harris & Thrush Manufacturing Company, Wolfforth, Tex.

[21] Appl. No.: 310,377

[22] Filed: Oct. 13, 1981

[51] Int. Cl.³ ............................................. B30B 13/00
[52] U.S. Cl. ........................................ 100/35; 100/53; 100/100; 100/269 R; 292/144
[58] Field of Search ................... 100/35, 53, 100, 226, 100/269 R; 292/144

[56] References Cited

U.S. PATENT DOCUMENTS

| | | | |
|---|---|---|---|
| 3,298,550 | 1/1967 | Schlitz | 414/491 |
| 3,404,622 | 10/1968 | Flanagan | 100/100 |
| 3,749,003 | 7/1973 | Wilkes | 100/100 |
| 3,851,577 | 12/1974 | Newcom | 100/100 |
| 3,941,047 | 3/1976 | Orlando | 100/100 |
| 3,961,572 | 6/1976 | Johnston | 100/100 |
| 4,090,731 | 5/1978 | Bopp | 292/144 |
| 4,286,511 | 9/1981 | Johnson | 100/35 |

FOREIGN PATENT DOCUMENTS 223732 3/1959 Australia ............................ 100/100

Primary Examiner—Billy J. Wilhite
Attorney, Agent, or Firm—Wendell Coffee

[57] ABSTRACT

A cotton module builder has a hydraulic cylinder which extends far above the top of the builder in operating position. The cylinder is latched in the upper position so that it may be lowered when the module builder is moved. A wedge-shaped tongue upon the carriage of the builder is hydraulically moved into a tube having an inclined surface to snugly wedge and latch the tramper cylinder into the upper operating position. The source of hydraulic pressure to move the wedge-shaped tongues is taken from the top of the hydraulic latch cylinder; therefore the latch may be withdrawn or released only when there is pressure in the top of the tramper cylinder, which will be forcing the tramper cylinder in the up position.

4 Claims, 2 Drawing Figures

4,402,260

HYDRAULIC PACKER SAFETY LATCH

BACKGROUND OF THE INVENTION (1) Field of the Invention

This invention relates to making cotton modules and more particularly to latching the packer cylinder in the operative position.

(2) Description of the Prior Art

In recent years module builders or makers have been developed for forming harvested seed cotton into modules for field storage before moving the modules to the gin. The modules are stacks of cotton which have been firmly packed or tramped so they are self-supporting and form a unitary unit even when they are picked up on a truck to be moved. The basic module maker is shown in U.S. Pat. No. 3,749,003 and U.S. Pat. No. 3,941,047. The modules are moved by equipment originally designed to move hay stacks and shown in U.S. Pat. No. 3,298,550.

As seen, the module maker itself has a front and two side walls. The side walls are angled outward so that the module is tapered. Therefore, by raising the module maker upward, the sides come free from the module. Then, the module maker can be moved to another location for making another module. If the move entails the moving of the module maker under electric high lines or along highways, or the like, it is necessary to lower the hydraulic cylinder, which is used for packing the cotton in the module.

According to commercial embodiments made according to my previous patent, U.S. Pat. No. 4,286,511, the cylinder was held in the elevated position by a hook and bail arrangement. The bail was actuated by a toggle mechanism. This was a manually operated device, which necessitated the operator leaving his normal operating station and going onto the carriage supporting the cylinder to manually operate the toggles.

It is particularly important that the cylinder never be unlatched from the carriage unless it is supported in the raised position by hydraulic fluid. When the tramper is in the extreme lower position, it is held by stops on the top of the guide rods so that hydraulic fluid pushing the tramper down will push upward on the top of the hydraulic cylinder and support it when the tramper is resting against an obstruction (such as cotton or the stops). If the cylinder latches are unlatched when there is pressure in the cylinder, there will be no dropping of the equipment or free fall of the equipment because the hydraulic fluid must flow from the cylinder before the cylinder can move to the lower position.

SUMMARY OF THE INVENTION

New and Different Function

I have invented a latch for latching the hydraulic cylinder to the carriage, which may be operated only if the hydraulic cylinder has pressure on the top of the hydraulic cylinder holding it in the upper or raised position. This is accomplished by having hydraulically actuated wedges to latch the cylinder in the upper or operating position. The hydraulic cylinders operating the wedges are connected to the hydraulic line supplying pressure to the top of the cylinder. Therefore, unless there is pressure in this line, the hydraulic latch cylinders cannot be operated to withdraw the wedges.

The wedges have an inclined plane mating surface so that they snugly and securely hold the parts in a firm position. I.e., even if wear or deformation occurs, the latch cylinders will push on the incline planes until the parts are snugly and firmly held together.

Thus it may be seen that the total function of my invention far exceeds the sum of functions of the individual wedges, valves, cylinders, etc.

Objects of this Invention

An object of this invention is to make cotton modules safely and to move the module builder from one location to another safely.

Further objects are to achieve the above with a device that is sturdy, compact, durable, lightweight, simple, safe, efficient, versatile, ecologically compatible, energy conserving, and reliable, yet inexpensive and easy to manufacture, adjust, operate and maintain.

Other objects are to achieve the above with a method that is versatile, ecologically compatible, energy conserving, rapid, efficient, and inexpensive, and does not require highly skilled people to adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
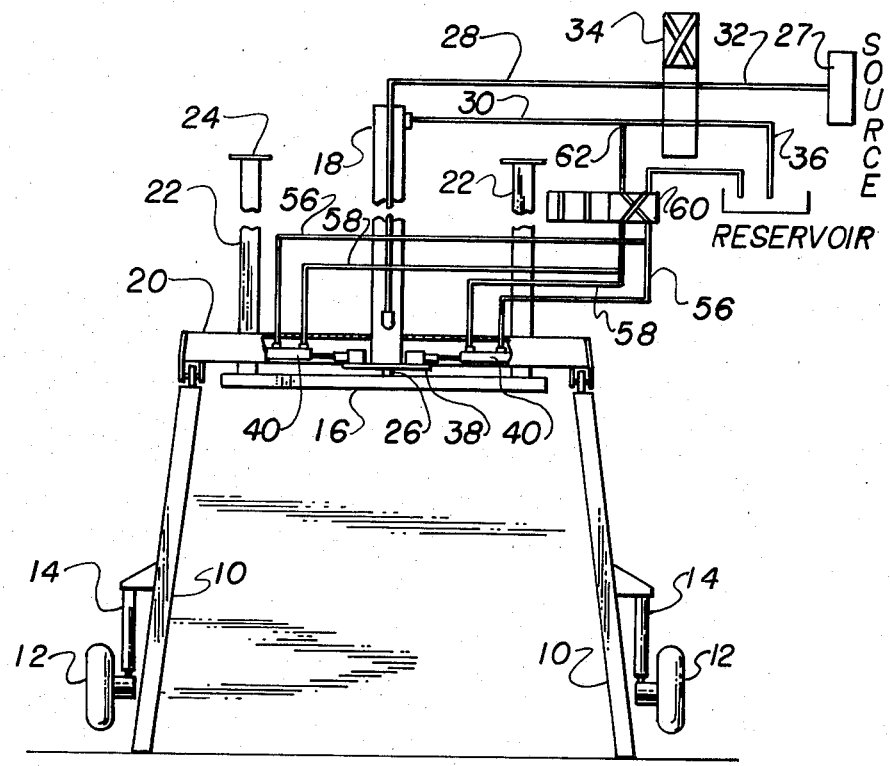
FIG. 1 is a schematic representation of a module builder having an embodiment of my invention thereon.
Figure 2:
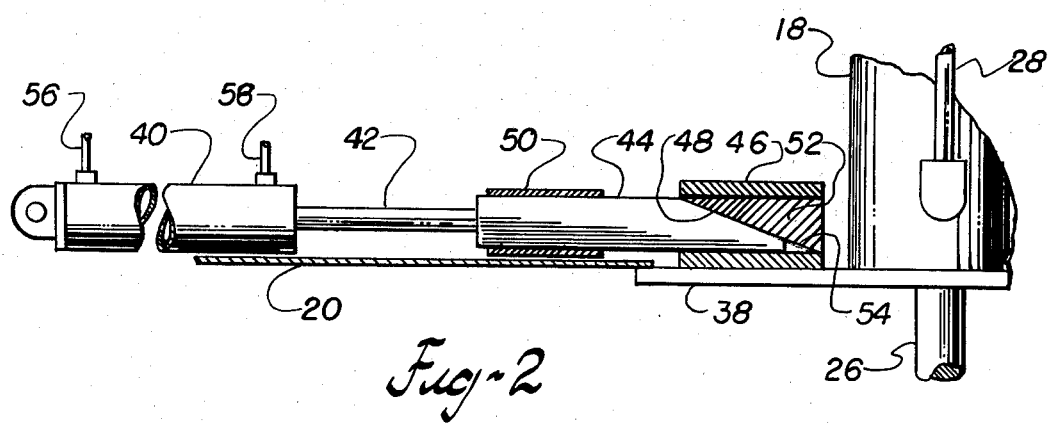
FIG. 2 is a sectional detail of a latch according to my new invention.

Referring to the drawings, and particularly to FIG. 1, there may be seen a module builder. As stated above, and with reference to the identified prior art, the module builder includes side walls 10. These side walls angle outward so that after the module has been formed, that elevation of the side walls by wheels 12 will cause the module builder to release the module so that the module is not damaged as the builder is moved forward. The wheels are readily moved up and down by the wheel raisers 14 attached to the outside of the side walls 10.

As more fully explained and illustrated in my prior U.S. Pat. No. 4,286,511, tramper foot 16 can be lowered to the full lower position only after the module builder has been moved away from the module. Otherwise the cotton module itself would block the downward passage of the tramper foot 16.

Carriage 20 spans the module builder and the module. Carriage 20 extends from one side wall 10 to the other, being mounted for travel along the side walls. The tramper foot 16 is connected to guide rods 22 which guide the travel of the tramper foot 16 up and down. The guide rods 22 and tramper stops 24 on the top of the guide rods 22 above the carriage 20 and foot 16 form the tramper.

Tramper cylinder 18 has piston rod or ram 26 telescoped therein. By hydraulic pressure from a source 27 of hydraulic pressure through lift line 28 and tramp line 30, the ram 26 together with the tramper is raised and lowered to tramp the cotton thus forming the module. The source 27 of hydraulic fluid under pressure will ultimately be a pump which may well be mounted upon an auxiliary piece of equipment. Therefore, to the lines 28 and 30, the source of hydraulic fluid might also be thought of as main supply line 32 which is illustrated in the drawing as extending from the source 27.

Tramper valve 34 connects the main supply line to the lift line 28 and tramp line 30 so that the pressure may be applied to either of these lines and the other line connected through reservoir line 36. The tramp line 30 is so named because pressure within the tramp line forces the tramper down to tramp the cotton. The lift line is so named because pressure in the lift line lifts the tramper.

Flange 38 upon the bottom of the tramper cylinder 18 abuts against the bottom of the carriage 20 to hold the tramper cylinder 18 securely in place.

Module builders and their operation are well-known and commercially available on the market as described to this point.

My improved invention includes hydraulic latch cylinder 40 attached to the carriage 20. The latch cylinder 40 has a piston rod or ram 42 which extends toward the tramper cylinder 18. Tongue 44 is attached to the end of the ram 42. It has bevels on the front edge to guide it into tube 46 mounted upon the tramper cylinder 18. The tongue 44 is wedge-shaped. That is, it has an incline surface 48 upon its upper surface. The tongue 44 is mounted in guide 50 attached to the carriage 20 for horizontal reciprocation. The guide 50 has a rectangular cross section inasmuch as the tongue 44 has a rectangular cross section.

The tube 46 has a structure member 52 in the top thereof. The structure member 52 has a downward facing incline surface 54. When the tongue 44 is extended by the latch cylinder 40 into the tube 46, the incline surface 48 on the tongue 44 will mate with the downward facing incline surface 54 on the tube 46 so that the tramper cylinder 18 is held firmly in position. I.e. the tramper cylinder 18 will be held by the tongue 44 going underneath structure 52 on the tramper cylinder 18 to hold the tramper cylinder 18 firmly in place.

I prefer the above described configuration and relationship for many reasons including its convenient relationship between the cross beams forming the carriage 20. However, it will be readily understood that the tongue 44 could extend under any surface on the tramper cylinder 18. For example, it could extend under the flange 38 on the bottom of the tramper cylinder 18.

The latch cylinder 40 has a latch line 56 and an unlatch line 58. Pressure in the latch line 56 will cause the ram 42 to move the tongue 44 into the latch position. Pressure in the unlatch line 58 will cause the latch cylinder 40 to pull the tongue 44 from the tube 46 and thus unlatch the tramper cylinder 18. The latch line 56 and unlatch line 58 are attached to latch valve 60, which attaches to tee 62 in the hydraulic tramp line 30.

By using the hydraulic tramp line 30 as the source of hydraulic fluid for the latch cylinder, analysis will show that the latch cylinder can be operated only if there is pressure in the tramp line 30. There will be pressure in the tramp line only if the tramper is bearing against an obstruction. Specifically, tramp line 30 will be pressurized only if the tramper foot 16 is against a solid object or the tramper stops 24 are against the top of the carriage 20. When the tramper is moving down, unobstructed, the weight of the tramper will prevent a pressure buildup within the tramp line 30. However, when the tramper moves to the full bottom position and the stops 24 contact the carriage 20, there will be a pressure buildup, which permits the latch cylinder 40 to latch or unlatch by moving the tongue 44 into or out of the tube 46. Any time there is pressure within the top of the cylinder or in the tramp line, the cylinder will be forced into the upper position so that when the mechanism is in the unlatched position, it will not fall, but is supported by the hydraulic fluid.

Only one latch cylinder 40 with tongue 44 and tube 46 has been described. It is desirable to have two latch cylinders, tongues and tubes, one on each side of the tramper cylinder 18.

Thus it may be seen that I have provided a safe method of and mechanisms for operation so that the tramper cylinder 18 may be raised and lowered without any danger of dropping the mechanism or without the necessity of the operator moving out of his normal operating position onto the carriage 20.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a cotton module builder having
   a. side walls,
   b. a carriage extendig from one side wall to the other,
   c. a tramper mounted for vertical reciprocation to the carriage with
      (i) a foot on the bottom, and
      (ii) a stop on the top,
   d. a hydraulic tramper cylinder on the carriage,
   e. a flange on the lower end of the tramper cylinder,
   f. a reciprocating ram telescoped within the cylinder and attached to the tramper foot
   g. a source of hydraulic fluid under pressure,
   h. a hydraulic tramp line attached to the top of the tramper cylinder,
   i. a hydraulic lift line attached to the bottom of the tramper cylinder, and
   j. a tramper valve attaching the tramp line and lift line to the source;
   an improved latch for releasable holding the hydraulic cylinder flange firmly against the carriage comprising:
   k. a tongue mounted for movement on the carriage,
   i. a hydraulic latch cylinder for moving the tongue underneath structure on the tramper cylinder,
   m. a tee in said hydraulic tramp line,
   n. a latch valve on said tee,
   o. a hydraulic latch line and unlatch line extending from said latch valve to the latch cylinder,
   p. so that the latch cylinder may be actuated only when pressure is in said tramp line.

2. The invention as described in claim 1 having limitations a. through p. further comprising:
   q. said tongue having a tapered upper surface which fits snugly against a mating surface on the tamper cylinder.

3. The invention as described in claim 1 having limitations a. through p. further comprising:
   q. said tongue in the form of a wedge with
   r. an inclined plane upper surface, and
   s. a tube on the cylinder having
   t. a downward facing inclined plane which is the surface on the tramper cylinder.

4. The process involving a cotton module builder having
a. side walls,
b. a carriage extending from one side wall to the other,
c. a tramper mounted for vertical reciprocation to the carriage with
   (i) a foot on the bottom, and
   (ii) a stop on the top,
d. a hydraulic tramper cylinder on the carriage,
e. a flange on the lower end of the tramper cylinder,
f. a reciprocating ram telescoped within the cylinder and attached to the tramper foot
g. a source of hydraulic fluid under pressure,
h. a hydraulic tramp line attached to the top of the tramper cylinder,
i. a hydraulic lift line attached to the bottom of the tramper cylinder, and
j. a tramper valve attaching the tramp line and lift line to the source;
wherein the improved method comprises:
k. releasably latching the tramper cylinder on the carriage and
l. using pressure in the tramp line as the sole source of force to unlatch the tramper cylinder.

* * * * *